May 7, 1929.  J. PEPPIN  1,712,164
ANTIAIRCRAFT SCREEN
Original Filed April 1, 1927
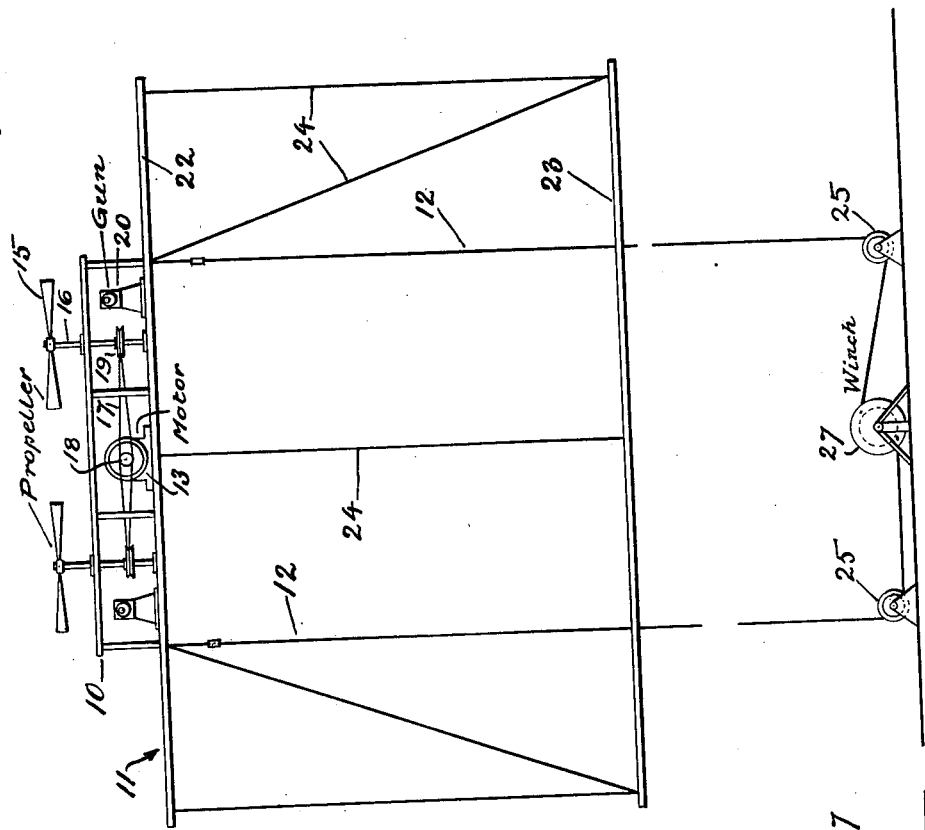
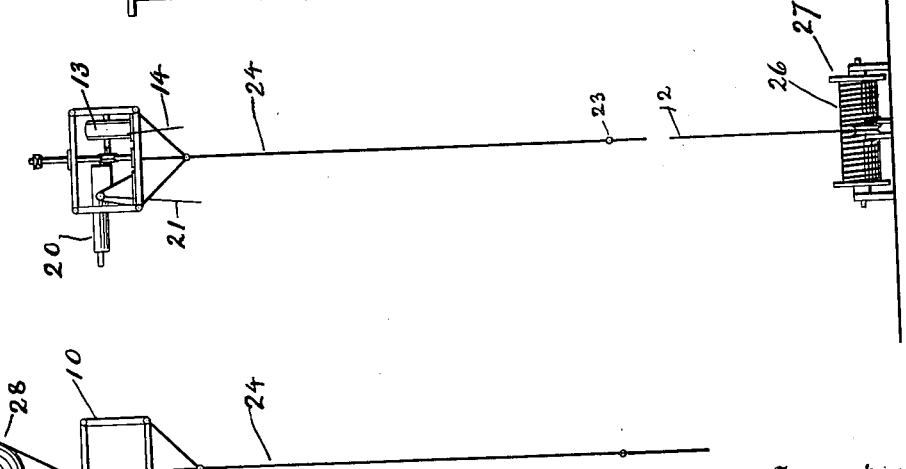
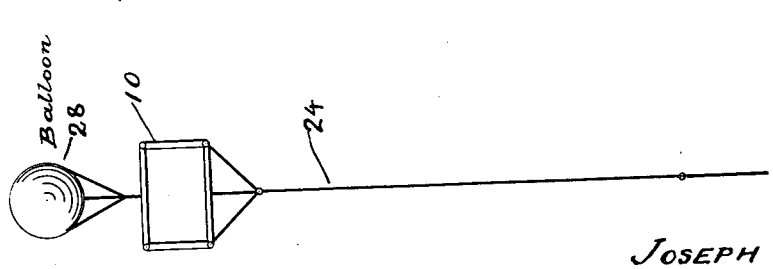
Inventor
JOSEPH PEPPIN.
Herman Jakobsson
Attorney Patented May 7, 1929.

1,712,164

UNITED STATES PATENT OFFICE.

JOSEPH PEPPIN, OF SCIOTA, NEW YORK.

ANTIAIRCRAFT SCREEN.

Application filed April 1, 1927, Serial No. 180,116. Renewed January 14, 1929.

My invention relates to a device intended for defending military camps, troops, stores or ammunition supplies against enemy air craft attacks.

The invention may be compared with screens or curtains carried by warships and submerged into the water in order to catch torpedoes or prevent ramming by submarine vessels.

The object of my invention is accordingly to surround a camp for instance, with what may be called an aerial fence, or to set up the same along trenches where an air attack may be expected. For this purpose the screen or wire fence is suspended under a lifting apparatus in the form of helicopters or balloons, able to raise the screen substantially in perpendicular direction from the ground to the height of a flying machine such as an airplane for instance. The screen is moreover suitably anchored to the ground as by cables, making the apparatus captive like a captive balloon.

Whenever an air attack is expected several of these screens are released and permitted to rise to a desired height above the ground. In this manner they will intercept approaching airplanes which then will become entangled in the wires of the screen, thus preventing all further flight and destructive attack.

It must be evident that my anti-aircraft wire screen will be most effective at night, in cloudy weather or in conjunction with a barrage, when the screen becomes completely invisible. The wire screen is naturally of considerable depth so that it will be sure to catch airplanes at various heights. In order to make the apparatus as invisible as possible a very light built or skeleton frame is used to carry the same and the lifting propellers or balloons. The wires themselves are very light and could of course not be seen at a distance. The screens are preferably constructed in short sections of about fifty to a hundred feet each and set up end to end along the trenches to form a long defence line.

The sustaining cables may be attached to the drum of a capstan or hand winch to facilitate the lowering of the screens after use. This will prevent all entanglement of the wires and keep the apparatus ready for immediate ascension when next needed.

In some cases I might provide one or more guns at the top of the apparatus, with or without the screen proper, which may be operated electrically from the ground both for training and firing.

In the accompanying drawing my invention is illustrated in its simplest form and Figure 1 represents a front elevation of my antiaircraft screen using propellers for lifting; Figure 2, a right hand end view of Fig. 1; and Figure 3 a view similar to Fig. 2 but fitted with balloons instead of propellers.

Reference numeral (10) is the supporting or main frame from which is suspended the screen (11). By means of cables (12) one at each end, the frame is anchored to the ground.

The main frame is made as light as possible and consists preferably of a system of metallic rods, although other material may be used, such as hickory or other wood. The essential feature of the frame is, that it combines lightness with invisibility or in other words that the weight of the entire apparatus is small enough to permit of its rapid ascension; and that it at the same time is constructed of very thin parts in order to give very slight wind resistance and cannot readily be seen at a short distance.

On the supporting frame (10) is mounted an electric or other motor (13) which is preferably actuated from the ground by electric conductors (14). Two or more helicopters or lifting propellers (15) are mounted on vertical shafts (16) carried in suitable bearings on the main frame and are revolved by belts (17) running over sheaves (18 and 19) from the motor (13).

The main frame may carry one or more guns (20), machine guns having been shown in Figs. 1 and 2, which are also preferably operated, both as to aiming and firing, from the ground by means of electric conductors (21).

The intercepting screen (11) consists of an upper, longitudinally running bar (22) and a similar lower bar (23) between which are stretched a plurality of fine wires (24) or chains spaced at suitable distance to catch an airplane. The ends of the lower bar (23) may be secured to the cables (12) to prevent the screen from swaying and to give a firm support.

The cables (12) may be anchored directly to the ground or preferably as indicated in Figs. 1 and 2, carried over pulleys (25) to a drum (26) of a winch (27). In this manner it will be possible to lower the screen when not needed. When no winch is provided the screen may be lowered by pulling on the cables (12).

Referring to Fig. 3, the construction is in the main the same as described above with the difference that instead of propellers (15) for lifting the apparatus, balloons (28) have here been provided. This will lighten the construction considerably, because the motor and shafting are unnecessary and if the guns are also dispensed with, a still greater saving in weight will be obtained. As already stated the supporting frame (10), screen (11) and anchoring cables (12) are the same in both constructions.

My anticraft screen is built in comparatively short sections, one of which being illustrated on the drawing. These sections are set up end to end along a trench line or around a field camp so as to form a continuous screen. At night, in the dusk or on a cloudy day the screen will not be seen at all by an approaching squadron of enemy airplanes and during day time, even if no barrage is used to conceal the location of the camp or trench, the screen will be practically undetectable and will accordingly be of great protection against an enemy attack from the air and unless passing at a very great height, an airship could not miss the screens but must be caught therein.

Two or more lines of screens may be set up, one behind the other and at different heights, in which case the chances of a successful surprise attack from an enemy would be brought to a minimum, as it would be impossible for an airplane to dodge the several rows of screens.

It is to be understood that my invention as here disclosed is not limited to the details of construction shown and described and that these may be varied widely without departing from the spirit of the invention as defined by the claims.

I claim:

1. An aerial fence, comprising a main frame, a rigid screen suspended therefrom, lifting means and anchoring means therefor; the main frame consisting of longitudinal and lateral rods of light weight material in the formation of a horizontally positioned rectangular cage adapted to house said lifting means; said screen including upper and lower parallel bars and wires stretched perpendicularly and diagonally between them, said upper bar forming an extension of said main frame.

2. An aerial fence, comprising a main frame, a rigid screen suspended therefrom, and lifting means therefor as set forth in claim 1; the lifting means including a helicopter adjacent each end of said frame, a motor and suitable transmission between the helicopters and the motor.

3. An aerial fence as set forth in claim 1; the lifting means including a helicopter adjacent each end of said frame, a motor and suitable transmission between the helicopters and the motor; a source of power on the ground, and conductors between said source and the motor; said anchoring means including a winch on the ground and cables from the winch to the main frame.

4. A continuous anti-aircraft fence including a plurality of independent sections; each section comprising a main frame, a rigid screen suspended therefrom, lifting means and anchoring means therefor; the main frame consisting of longitudinal and lateral rods in the formation of a horizontally positioned rectangular cage adapted to house said lifting means; said screen including upper and lower parallel bars and wires stretched perpendicularly and diagonally between said bars, the upper bar forming extension on said main frame; the lifting means including a helicopter adjacent each end of said frame, a motor and suitable transmission between the helicopters and the motor.

In testimony whereof I affix my signature.

JOSEPH X PEPPIN.
his mark